United States Patent
Bailey et al.

(10) Patent No.: US 7,747,893 B2
(45) Date of Patent: Jun. 29, 2010

(54) METHOD AND SYSTEM FOR MANAGING RESOURCES DURING SYSTEM INITIALIZATION AND STARTUP

(75) Inventors: Sheldon R. Bailey, Rochester, MI (US); Matthew S. Spinler, Rochester, MI (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/748,553

(22) Filed: May 15, 2007

(65) Prior Publication Data

US 2008/0288810 A1    Nov. 20, 2008

(51) Int. Cl.
G06F 11/00 (2006.01)
(52) U.S. Cl. ............................................. 714/2; 714/36
(58) Field of Classification Search .................. 714/2–3, 714/7, 23, 36, 47–48; 713/2
See application file for complete search history.

(56) References Cited

U.S. PATENT DOCUMENTS

| | | | |
|---|---|---|---|
| 4,209,828 A * | 6/1980 | Anderson et al. ............. 701/20 |
| 6,233,680 B1 | 5/2001 | Bossen et al. | |
| 6,298,449 B1 * | 10/2001 | Carter ......................... 713/340 |
| 6,496,945 B2 * | 12/2002 | Cepulis et al. ................. 714/25 |
| 7,301,538 B2 * | 11/2007 | Buyanovskiy ............... 345/426 |
| 7,555,677 B1 * | 6/2009 | Wiley et al. ................... 714/36 |
| 2002/0159180 A1 * | 10/2002 | McAllister et al. ............ 360/60 |

* cited by examiner

*Primary Examiner*—Dieu-Minh Le
(74) *Attorney, Agent, or Firm*—Cantor Colburn, LLP; Grant A. Johnson

(57) ABSTRACT

A method for managing a system's computer resources, includes: detecting an error condition in a computer resource; labeling the computer resource as not usable based on the error condition detected; reconfiguring the remaining computer resources to compensate for the detected error condition based on a failure mode policy; and wherein the failure mode policy manages the computer resources by one of: maximizing the amount of the remaining computer resources (mode 1), and maximizing the speed of the remaining computer resources (mode 2).

21 Claims, 2 Drawing Sheets

METHOD AND SYSTEM FOR MANAGING RESOURCES DURING SYSTEM INITIALIZATION AND STARTUP

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to computer systems, and more particularly to a method for managing resources during system initialization startup and run time operation.

2. Description of the Related Art

Computer systems and servers, when faced with an error condition, have generally taken a resource from "configured" and changed the resource's state to "deconfigured" or not usable. In most instances, hardware is deconfigured to remove the error condition. However, this blind deconfiguration of resources can leave the computer system in a degraded performance state and/or a degraded availability of resources, without the user or client being able to decide what is best for their needs or requirements.

Clients run many different types of applications on computer systems. Applications can vary in their needs from requiring the most resources possible or quantity (Mode one), or to requiring the fastest resources possible or speed (Mode two). For example, certain applications or uses require a vast amount of memory (quantity) such as a large document, while other applications require fast execution or computational speed such as a complex simulation or modeling program. Therefore there is a need for a user configurable algorithm that defines a computer system's behavior when faced with a failure or error condition.

SUMMARY OF THE INVENTION

Embodiments of the present invention include a method and system for managing computer resources wherein the method includes: detecting an error condition in a computer resource; labeling the computer resource as not usable based on the error condition detected; reconfiguring the remaining computer resources to compensate for the detected error condition based on a failure mode policy; and wherein the failure mode policy manages the computer resources by one of: maximizing the amount of the remaining computer resources (mode 1), and maximizing the speed of the remaining computer resources (mode 2).

A system for managing computer resources, the system includes: a set of hardware resources; an algorithm for managing the set of hardware resources; wherein when the algorithm detects an error condition in a hardware resource, the hardware resource is labeled as not usable based on the error condition detected; wherein the algorithm reconfigures the remaining hardware resources to compensate for the detected error condition based on a failure mode policy; wherein the failure mode policy manages the set of hardware resources; and wherein the failure mode policy either maximizes the amount of the remaining hardware resources (mode 1), or maximizes the speed of the remaining hardware resources (mode 2).

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a user configurable algorithm that defines a computer system's behavior when faced with a failure or error condition. The algorithm allows the user to overcome an error condition, by either optimizing the computer system speed or through put, or by maximizing the quantity of the available system resources.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
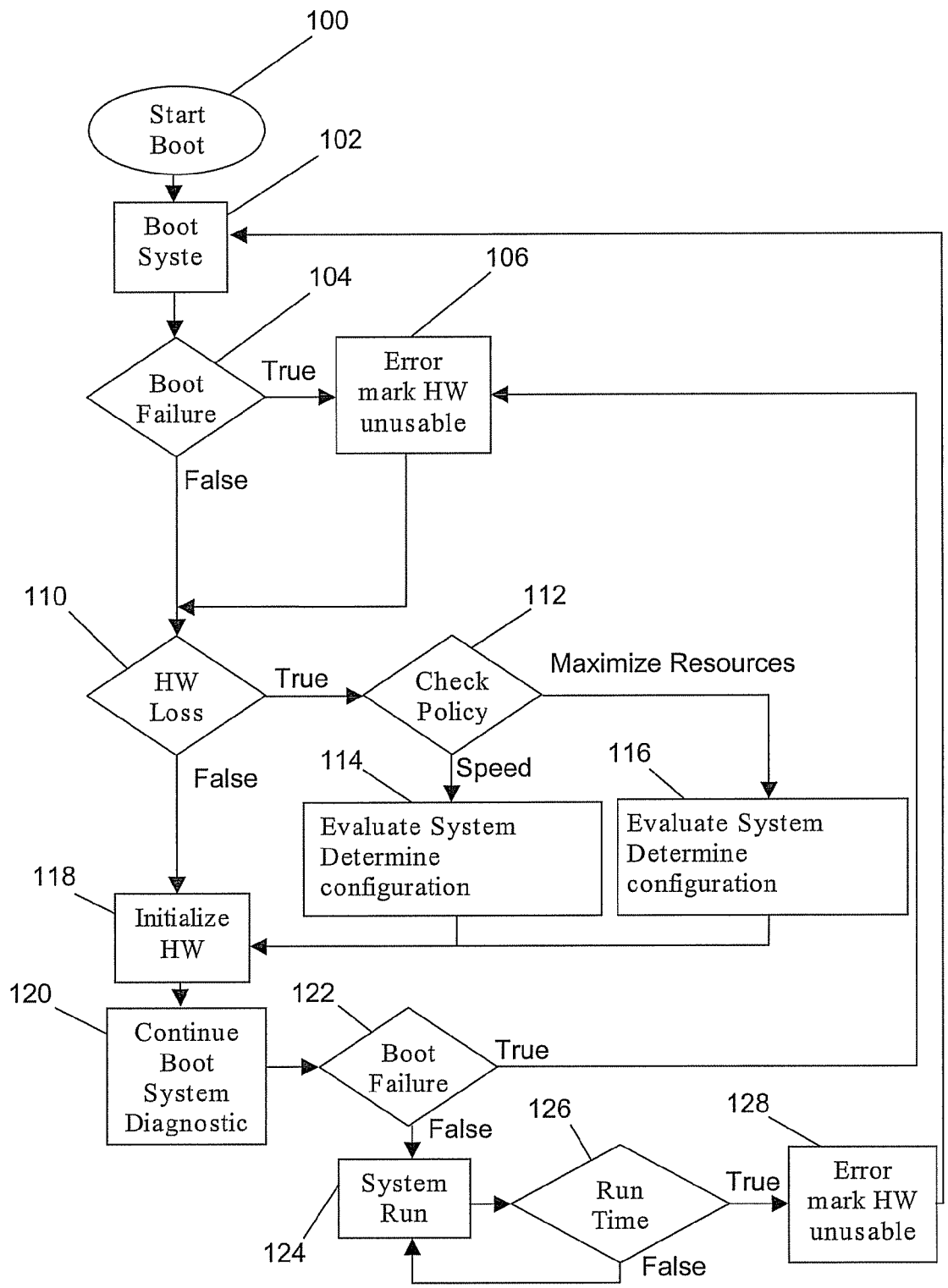
FIG. 1 is a flow diagram of an algorithm for overcoming an error condition in a computer system, by either optimizing the system speed or throughput, or by maximizing the quantity of the available system resources according to an embodiment of the invention.

The detailed description explains the preferred embodiments of the invention, together with advantages and features, by way of example with reference to the drawings.

DETAILED DESCRIPTION

Embodiments of the invention provide a user configurable algorithm that defines a computer system's behavior when faced with a failure or error condition. The algorithm allows the user to overcome an error condition, by either optimizing the computer system's speed or throughput, or by maximizing the quantity of the available system resources.

Embodiments of the algorithm of the current invention may be used in a computer system that has the ability to remove or deconfigure resources and still progress with initial program load (IPL), or boot the system for usage. Booting up is the process of powering on, initialization of the computer hardware, running diagnostics of the computer hardware, and the loading of the operating system. Boot firmware is software code with the logic that controls the booting up process. Usage of the algorithm starts with the customer being able to set a given hardware resource, such as memory, processors, input output interfaces (IO), networking devices, etc., to the deconfiguration mode that best fits the system usage or customer needs in case of a system related failure. The algorithm does not change the configurations or initialization parameters when there is no error encountered in the system.

Embodiments of the algorithm of the invention can be used for system errors encountered during IPL (boot), or during run time of the system.

For example, if an error is detected by the system's diagnostics during IPL (system boot up), and a system resource such as a dual in-line memory module (DIMM) group is labeled (marked) as not usable in the current configuration, then the DIMM group would be set for deconfiguration and removal from the system, with the loss of all that resource (4 DIMMs of X size) prior to the use of an embodiment of the algorithm of the present invention. By utilizing the algorithm, the system can look at a failure mode policy, as set by the user, (mode one—memory availability or mode two—memory performance) when an error occurs, and do one of the following.

Mode one determines if the resource may be reduced in size or speed in order to keep the maximum amount of resource (memory) in the system based on the error. For example, current server systems run a group of 4 DIMMs for a fast memory group, and upon a detected error the server system may be initialized to use a group of 2 DIMMs for a slower access to memory. If the problem is in the frequency of the bus to the memory, then the speed could be initialized to a slower speed and the resource (memory) left in the system.

Mode two attempts to keep the system at the highest performance possible. For example, server systems that run a 4 DIMM group experiences a performance loss (slowing the memory bus speed) by moving to a 2 DIMM group, so the algorithm would remove all resources (memory).

In the case of a run time failure, when the system diagnostics detect a resource (memory) error that is recoverable, the error is monitored for an error threshold. If the threshold is met, a report of service action is initiated, but the runtime condition does not change. However, during the next IPL, the system is placed in a "Persistent Deconfiguration and MODE change." For other runtime errors that are not recoverable and that may cause the system to crash, the system is sent immediately into a "Persistent Deconfiguration and MODE change."

In embodiments of the present invention the "Persistent Deconfiguration and MODE change" may be a mode-one memory error that would try and keep the most memory in the system as possible. A mode-two memory error would keep the memory in the system that can be configured to be the fastest. The user determines the mode based on the application or applications running on the system that require the most resource "X" as possible. The resource allocation required might be the need for the maximum amount of memory (mode one), such as programs that use large amounts of memory that would cause parts of the file to be cached in and out of memory. However, the user may have the same system ruining an application or applications that require the fastest resource "X" as possible. The resource allocation might be the need for Memory to move data in and out at the fastest speed possible.

FIG. 1 is a flow diagram of an algorithm for overcoming an error condition in a computer system, by either optimizing the system speed or throughput, or by maximizing the quantity of the available system resources according to an embodiment of the invention. The algorithm is started (block 100) when the system is booted (block 102). If the system successfully boots (block 104 is false) with no hardware loss (block 110), the hardware initialization is continued (block 118) and boot system diagnostics (block 120) are carried out. If the boot system diagnostics proceed without detecting an anomaly (block 122 is false), and the system achieves a run time status (block 124), the system continues to run until it is shutdown by the user or a run time failure (block 126 is true) is encountered. When a run time failure is encountered, the hardware is marked unusable (block 128) and the system is rebooted (block 102) to see if the failure condition still exists (block 104 is true). If however during boot system diagnostics (block 120) an error is detected (block 122 is true), the hardware is marked as unusable (block 106) and is checked for loss of usage (deconfigured) (block 110). If the hardware is lost (block 110 is true) the policy (block 112) with regards to resource utilization of the algorithm of an embodiment of the invention is consulted as to whether to maximize system resources (block 116)—emphasis on not losing additional hardware, or to optimize system speed (throughput) (block 114). If system speed (block 114) is the objective, additional hardware may be deconfigured. Following the policy decision (blocks 112, and block 114 or block 116), the hardware is initialized (block 118) and boot diagnostics (block 120) proceeds as previously described.

If boot failure (block 104 is true) occurs immediately on system startup the sequence of marking the hardware unusable (block 106) and checking for a hardware loss (block 110) proceeds as before with the use of the resource utilization policy (block 112) if hardware is deconfigured (block 110 is true).

Figure 2:
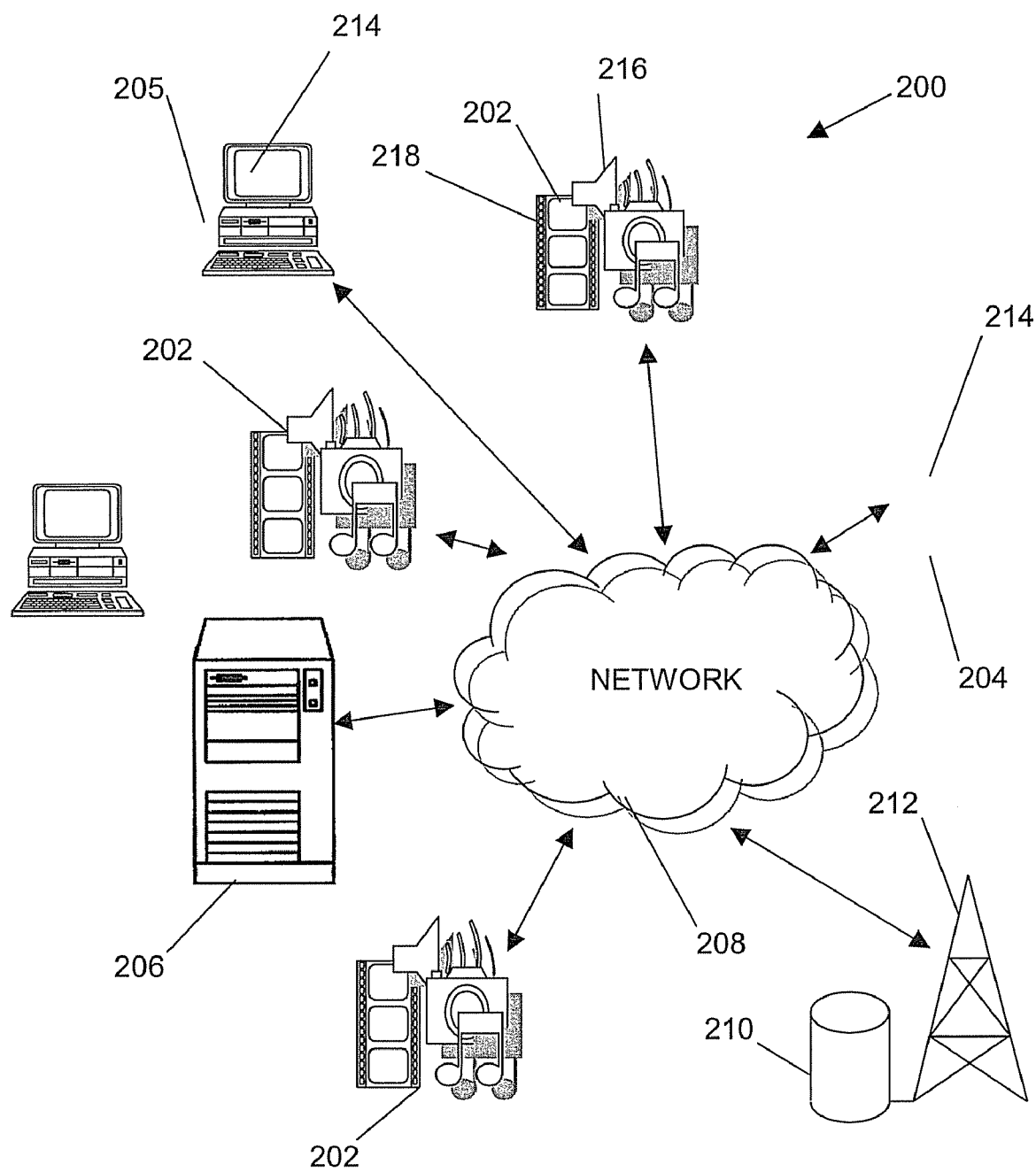
FIG. 2 illustrates a system for implementing an algorithm for overcoming an error condition in the system according to an embodiment of the invention.

FIG. 2 is a block diagram of an exemplary system 200 for implementing a user configurable algorithm that defines a computer system's behavior when faced with a failure or error condition according to an embodiment of the present invention, and graphically illustrates how these blocks interact in operation. The system 200 includes remote devices including one or more multimedia/communication devices 202 equipped with speakers 216 for implementing the audio, as well as display capabilities 218 for facilitating graphical user interface (GUI) aspects for setting resource utilization policies of the present invention. In addition, mobile computing devices 204 and desktop computing devices 205 equipped with displays 214 for use with the policy utilization GUI of the present invention are also illustrated. The remote devices 202 and 204 may be wirelessly connected to a network 208. The network 208 may be any type of known network including a local area network (LAN), wide area network (WAN), global network (e.g., Internet), intranet, etc. with data/Internet capabilities as represented by server 206. Communication aspects of the network are represented by cellular base station 210 and antenna 212. Each remote device 202 and 204 may be implemented using a general-purpose computer executing a computer program for carrying out the GUI described herein. The computer program may be resident on a storage medium local to the remote devices 202 and 204, or maybe stored on the server system 206 or cellular base station 210. The server system 206 may belong to a public service. The remote devices 202 and 204, and desktop device 205 may be coupled to the server system 206 through multiple networks (e.g., intranet and Internet) so that not all remote devices 202, 204, and desktop device 205 are coupled to the server system 206 via the same network. The remote devices 202, 204, desktop device 205, and the server system 206 may be connected to the network 208 in a wireless fashion, and network 208 may be a wireless network. In a preferred embodiment, the network 208 is a LAN and each remote device 202, 204 and desktop device 205 executes a user interface application (e.g., web browser) to contact the server system 206 through the network 208. Alternatively, the remote devices 202 and 204 may be implemented using a device programmed primarily for accessing network 208 such as a remote client.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may male various improvements and enhancements which fall within the scope of the claims which follow. These claims should be construed to maintain the proper protection for the invention first described.

What is claimed is:

1. A method for managing a system's computer resources, the method comprising:
   detecting an error condition in a computer resource;
   labeling the computer resource as not usable based on the error condition detected;
   reconfiguring the remaining computer resources to compensate for the detected error condition based on a failure mode policy; and
   wherein the failure mode policy manages the computer resources by one of: maximizing the amount of the remaining computer resources (mode 1), and maximizing the speed of the remaining computer resources (mode 2).

2. The method of claim 1, further comprising receiving a user selection of the failure mode policy.

3. The method of claim 2, wherein the error condition is detected during initial startup.

4. The method of claim 2, wherein the error condition is detected during run time.

5. The method of claim 4, wherein when the error condition is recoverable, the error is monitored for an error threshold, and the runtime condition is not changed;
   wherein when the error threshold is met, a report of service action is initiated;
   wherein during the next startup of the system, the system is placed in a persistent deconfiguration and MODE change state; and
   wherein the persistent deconfiguration and MODE change state places the remaining computer resources in a mode 1 or mode 2 condition.

6. The method of claim 4, wherein when the error condition is not recoverable, the system is sent immediately into a persistent deconfiguration and MODE change state; and
   wherein the persistent deconfiguration and MODE change state places the remaining computer resources in a mode 1 or mode 2 condition.

7. The method of claim 2, wherein the failure mode policy is user configurable.

8. The method of claim 2, wherein the failure mode policy to be implanted is determined by the application being run with the computer resources.

9. The method of claim 2, wherein the computer resources are memory modules.

10. The method of claim 2, wherein the computer resources are processor units.

11. The method of claim 2, wherein the computer resources are input output (IO) interface devices.

12. The method of claim 2, wherein the computer resources are network devices.

13. A computer system, the system comprising:
   a set of hardware resources;
   an algorithm for managing the set of hardware resources;
      wherein when the algorithm detects an error condition in a hardware resource, the hardware resource is labeled as not usable based on the error condition detected;
      wherein the algorithm reconfigures the remaining hardware resources to compensate for the detected error condition based on a failure mode policy; and
      wherein the failure mode policy manages the hardware resources by one of: maximizing the amount of the remaining hardware resources (mode 1), and maximizing the speed of the remaining hardware resources (mode 2).

14. The computer system of claim 13, wherein the algorithm further receives a user selection of the failure mode policy.

15. The computer system of claim 14, wherein the error condition is detected during initial startup.

16. The computer system of claim 14, wherein the error condition is detected during run time.

17. The computer system of claim 16, wherein when the error condition is recoverable, the error is monitored for an error threshold, and the runtime condition is not changed;
   wherein when the error threshold is met, a report of service action is initiated;
   wherein during the next startup of the system, the system is placed in a persistent deconfiguration and MODE change state; and
   wherein the persistent deconfiguration and MODE change state places the remaining hardware resources in a mode 1 or mode 2 condition.

18. The computer system of claim 16, wherein when the error condition is not recoverable, the system is sent immediately into a persistent deconfiguration and MODE change state; and
   wherein the persistent deconfiguration and MODE change state places the remaining hardware resources in a mode 1 or mode 2 condition.

19. The computer system of claim 14, wherein the failure mode policy is user configurable.

20. The computer system of claim 14, wherein the failure mode policy to be implanted is determined by the application being run with the hardware resources.

21. The computer system of claim 14, wherein the hardware resources are at least one or more of the following: memory modules, processor units, IO devices, and network devices.

* * * * *